B. HERSHEY.
Machine for Welding Chain Links.
No. 166,372.  Patented Aug. 3, 1875.
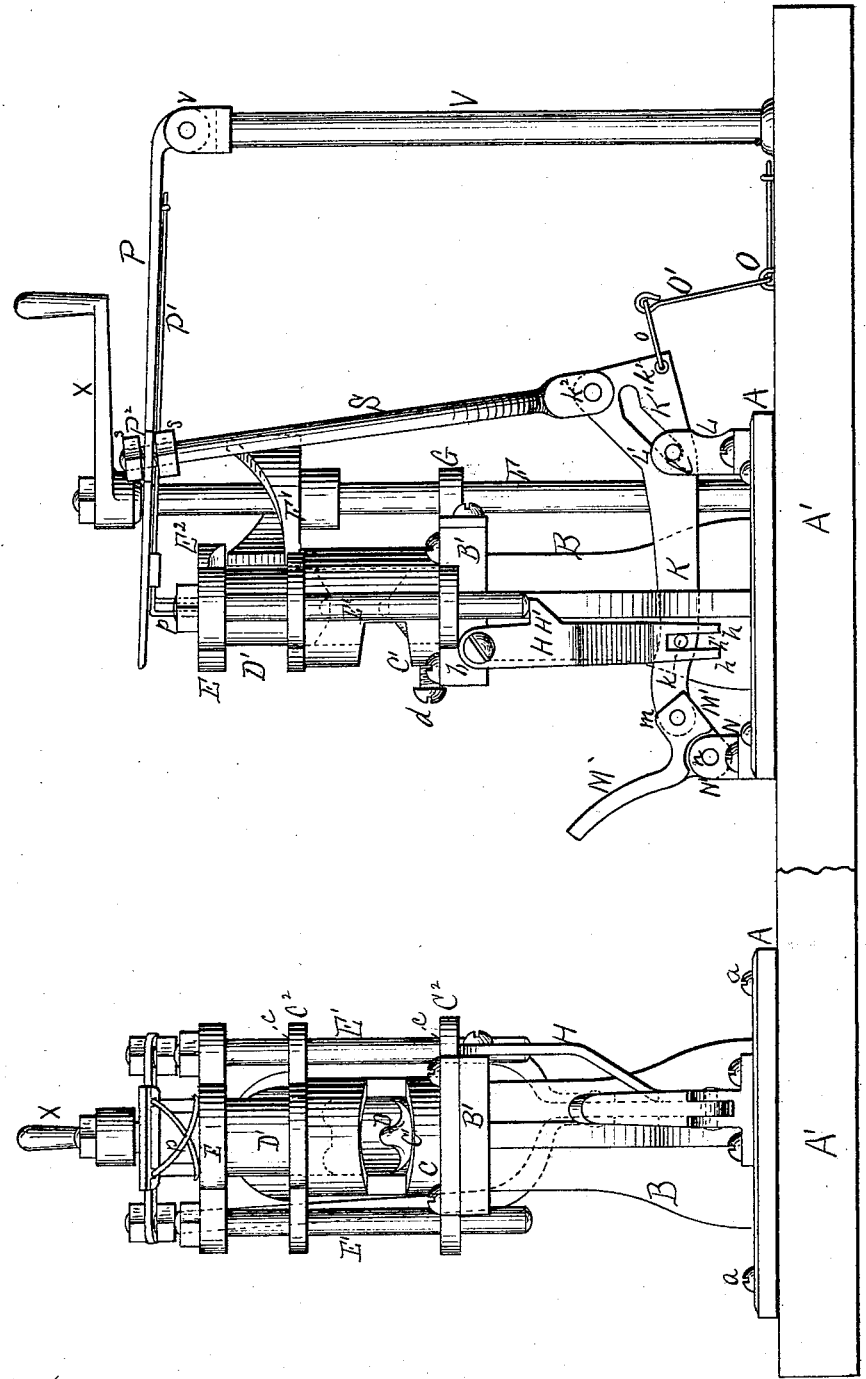
Witnesses:
Edwin James
John K. Jones
Inventor:
Benjamin Hershey.
per J. E. J. Holmead
Attorney.

ly connected to a horizontal
UNITED STATES PATENT OFFICE.

BENJAMIN HERSHEY, OF ERIE, PENNSYLVANIA, ASSIGNOR TO PITTSBURGH CHAIN AND CAR-LINK MANUFACTURING COMPANY.

IMPROVEMENT IN MACHINES FOR WELDING CHAIN-LINKS.

Specification forming part of Letters Patent No. 166,372, dated August 3, 1875; application filed March 13, 1875.

CASE B.

*To all whom it may concern:*

Be it known that I, BENJAMIN HERSHEY, of the city and county of Erie, and State of Pennsylvania, have invented certain Improvements in Chain-Link-Welding Machines, of which the following is a full, clear, and exact description, reference being had to the accompanying drawing and the letters of reference marked thereon, making part of this specification, in which—

Figure 1 is a side view. Fig. 2 is a front view.

My present invention is an improvement on the invention embraced in and covered by Letters Patent of the United States issued to me May 20, 1873, No. 139,151; and consists in a novel arrangement of mechanism, through which, by depressing the treadle, the spring is drawn to a position to act on the movable die, the stop-arm is released, and the hammer-arm thrown in contact with the motor-cam.

The construction and operation of my invention are as follows: A is the bed-piece of the machine, and may be secured by bolts $a\,a$, or other attachments, to any suitable platform or other support, A'. B is a vertical stud or support, that is cast with, or otherwise seated on or firmly secured at, the center of the bed-piece A. B' is a horizontal or flat table, cast with or otherwise firmly secured to the support B. To this table B' is bolted the die-box C, and which is a cylindrical sleeve having a portion of its front face cut away, as shown at $C^1$, so as to provide a suitable opening for the insertion and removal of the link after the same has been welded through the action of the die. The upper and lower bearing-surfaces of this die-box C are provided with lateral flanged bearings $C^2\,C^2$, as clearly shown in Fig. 2, and in which are openings $c\,c$, in which rest and travel the parallel arms of the gate or frame that carries the movable or hammer die. At the lower section of the die-box or cylindrical sleeve C is secured, by means of a detachable fastening, $d$, the stationary or lower die D. D' is the movable or plunger die, and is formed with or securely connected to a horizontal plate, E, and which plate constitutes the upper bearing-surface of the gate or frame that operates the movable plunger-die. From this plate E extend the parallel guide-arms E $E^1$, and which constitute the sides of the gate, and which rest in and travel through the openings $c\,c$ of the flanged bearings $C^2\,C^2$, as clearly shown in Fig. 2. There is nothing peculiar as to the form of the cavities in the dies D D' in my present invention, and consequently, as they may be of any usual or desired form, they need not any particular description, and especially is this the case as the mechanism employed in connection with their operation, and which is hereinafter described, constitutes the present invention, and is alike applicable to all sets of dies, it matters not what the form of their cavities may be. At the rear of the stud or support B is seated and secured so as to revolve freely a vertical cam-shaft, F, and which carries the cam-wheel F', and through the inclined bearing $E^2$, at the rear surface of the plate E, this cam-wheel F' imparts the necessary movement to the gate that carries the traveling die D, to cause it, through its repeated plunging action, to so hammer the metal as to effect the desired weld. This cam-shaft is secured so as to insure its proper revolution in suitable bearings, G, at the rear of the table or plate B', and in an opening through the center of the bed-plate spring. This cam-shaft, cam-wheel, and its bearing, in connection with the plunger-die, is, in all respects, precisely similar to a kindred combination of devices, as illustrated in my patent before referred to. H is a stop-arm, and is secured by a pivot-bearing, $b$, to the table B', and has a free swinging or oscillating movement. On the rear lateral face of this arm is a bearing-shoulder, H', and its lower section terminates in forked or prong bearings $h\,h$, and which provide a central slot, $h'$, and which fits over a bearing-pin, $k$, on a pivoted horizontal lever, K.

The object, or rather the function, of this arm is precisely the same as that of the stop-arm in my former patent—that is, it is designed, when uncontrolled, to arrest the movement of the traveling die, and so secure the same that, although the cam may continue to be driven by the engine or other motor, it shall cease to operate the movable die, the same, through the stop-arm, being held in a position so elevated that its bearing $E^2$ is entirely free from all contact with the face of the cam, thus allowing an opportunity for the ready insertion and removal of the metal being welded without checking, or in any manner interrupting, the speed of the engine or other driving motor. This horizontal lever K has a slotted bearing, K', and which fits and works over a pin, $l$, secured between vertical jaws L' L' of the bearing L, secured at the rear of the bed-piece A. The form, arrangement, and attachments of this lever K are all clearly shown in Fig. 1. This lever K passes through a slot in the stud or support B, and at its forward section is pivoted at $m$ to the bell-crank-shaped termination M' of the treadle M. This treadle M is secured by a pivot-bearing, $n$, between the jaws N' N' of the bearing N, secured at the front section of the bed A. On the platform A', and at the rear of the bed-piece A, is secured a torsion-spring, O, and to the lateral lever-arm O' of which is attached a link or other suitable bearing, $o$, and which connects it with the eye $k^1$ of the lever K. The tension of this spring is constantly exerted to draw the lever K in the direction shown in Fig. 1, and which, through its bearing-pin $k$ acting on the slotted arm $h'$, moves the stop lever or arm H to such a position as will cause its shoulder H' to catch under the arm $E^1$ when the gate is elevated, and thus arrest the downward movement of the plunger-die. P is a bed-plate, and to which is secured the torsion-spring $P^1$, the lateral lever-arms $p\ p$ of which have their bearings on the upper surface of the bearing-plate E of the plunger-die. This bed-plate P is pivoted in suitable bearings $v\ v$ at the upper section of a vertical stud or support, V, and which is seated and secured at the rear section of the platform A'. This bed-plate P is formed with lateral plate-bearings $P^2\ P^2$, and in which are secured by jam-nuts $s\ s$ the tong-shaped bearing-arms S S. These arms, at their lower section, are pivoted in the eye $k^2$ of the elevated head of the horizontal lever K. By means of the jam-nuts $s\ s$, in connection with the screw-threaded terminations of the arms S S, their bearings can be adjusted, and the tension which the spring shall exert can be regulated.

As illustrated in the drawing, both of the springs O and $P^1$ are of the torsional class. While springs of this character are preferred there is nothing arbitrary about their use, as springs of any other character may be substituted.

From the foregoing full and detailed description the operation of my improved welding-machine will readily be understood.

We will imagine the machine to be in the position shown in Fig. 1. Power is now applied by means of a crank, X, or from an engine or other suitable motor, and the cam-shaft F and cam F' are caused to revolve; but they impart no motion to the plunger-die D', because the shoulder H' holds the arm $E^1$ of the gate in such an elevated position as to free its bearing $E^2$ from all contact with the face of the cam, and the torsion-spring $P^1$ is idle. The link or other metal to be welded, having been previously properly heated, can now readily be placed on the lower die, and the section to be welded properly arranged and adjusted in the cavity of the lower die D. So soon as it is properly arranged the operator presses on the treadle M, and which draws the lever K forward, and which frees the shoulder H' of the stop-arm H from all contact with the arm $E^1$ of the gate that carries the traveling die D, and the result is that its bearing $E^2$ is brought in contact with the cam F', and which alternately elevates and releases the same until, through the hammering action of the plunger-die, the welding is effected, and which operation is greatly facilitated by the power which the spring now exerts, for when the lever K is drawn forward through the depression of the treadle it not only causes the shoulder H' to disengage with the gate that carries the traveling die, so as to render the latter operative, but it also so draws, through the arms S S, the plate P down as to force the lateral lever-arms $p\ p$ in positive and direct contact with the bearing-plate E of the gate, and which, as the gate is elevated, so presses up the lever-arms of the spring as to cause them to twist and wrench the arms in such a degree as to cause the power of their torsional action to be developed, to add force to the downward plunge of the die.

The operation of welding being completed, and it being desired to remove the link or other metal, the foot or other pressure is removed from the treadle M, when instantly and automatically the spring O will draw the lever K backward, forcing the shoulder H' of the stop-arm $E^2$, and under the same the instant the gate is again elevated through the action of the cam F', and this movement of the lever K also so acts on the arms S S as to cause them to cease to draw down the plate P, and which instantly renders dormant the power or pressure which the spring $P^1$ had previously been caused to exert through the forward movement of the lever K drawing on the arms S S.

What I claim as new, and desire to secure by Letters Patent of the United States, is—

1. In a chain-link-welding machine, in combination with the vertical bearing that carries the movable die, the spring $P^1$, secured to a suitable bearing, P, stirrup S S, lever K, spring O, and treadle M, the whole being constructed and arranged to operate substantially as described.

2. In a chain-link-welding machine, in combination with the vertical bearing that carries the movable die, the cam F', stop-arm H, having a shoulder, H', lever K, springs O P¹, stirrup S S, and treadle M, the whole being constructed and arranged to operate substantially as described.

In testimony whereof I have signed my name to this specification in the presence of two subscribing witnesses.

B. HERSHEY.

Witnesses:
 JOS. T. K. PLANT,
 EDWIN JAMES.